(12) United States Patent
Hasenkamp

(10) Patent No.: US 11,754,180 B2
(45) Date of Patent: Sep. 12, 2023

(54) PARKING LOCK SYSTEM FOR A MOTOR VEHICLE

(71) Applicant: MERCEDES-BENZ GROUP AG, Stuttgart (DE)

(72) Inventor: Jan Hasenkamp, Allmersbach im Tal (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/786,595

(22) PCT Filed: Dec. 9, 2020

(86) PCT No.: PCT/EP2020/085314
§ 371 (c)(1),
(2) Date: Jun. 17, 2022

(87) PCT Pub. No.: WO2021/122233
PCT Pub. Date: Jun. 24, 2021

(65) Prior Publication Data
US 2023/0029244 A1    Jan. 26, 2023

(30) Foreign Application Priority Data

Dec. 18, 2019 (DE) .................... 10 2019 008 811.5

(51) Int. Cl.
*F16H 63/34* (2006.01)
*F16H 57/00* (2012.01)

(52) U.S. Cl.
CPC ..... *F16H 63/3425* (2013.01); *F16H 63/3483* (2013.01); *F16H 2057/0056* (2013.01)

(58) Field of Classification Search
CPC ........................................ F16H 63/3416–3491
See application file for complete search history.

(56) References Cited

U.S. PATENT DOCUMENTS

| 2018/0154881 A1* | 6/2018 | Heubner | ................. F16D 65/14 |
| 2020/0023818 A1* | 1/2020 | Hanker | ................. F16H 57/00 |

FOREIGN PATENT DOCUMENTS

| CN | 204358083 U | 5/2015 |
| DE | 102004037982 A1 | 2/2006 |
| DE | 102010061171 A1 | 6/2012 |
| DE | 102011086238 A1 | 6/2012 |

(Continued)

OTHER PUBLICATIONS

International Search Report dated Feb. 15, 2021 in related/corresponding International Application No. PCT/EP2020/085314.

(Continued)

*Primary Examiner* — David R Morris
*Assistant Examiner* — Aimee Tran Nguyen
(74) *Attorney, Agent, or Firm* — PATENT PORTFOLIO BUILDERS PLLC

(57) ABSTRACT

A parking lock system for a motor vehicle includes a parking lock housing mountable on a transmission housing. A pawl is mounted on the parking lock housing so as to be rotatable about an axis of rotation. A switching rod is mounted on the parking lock housing so as to be slidable in an actuation direction. An actuation element is mounted on the switching rod. The axis of rotation is arranged parallel to the actuation direction.

14 Claims, 2 Drawing Sheets

(56) References Cited

FOREIGN PATENT DOCUMENTS

Figure 1:
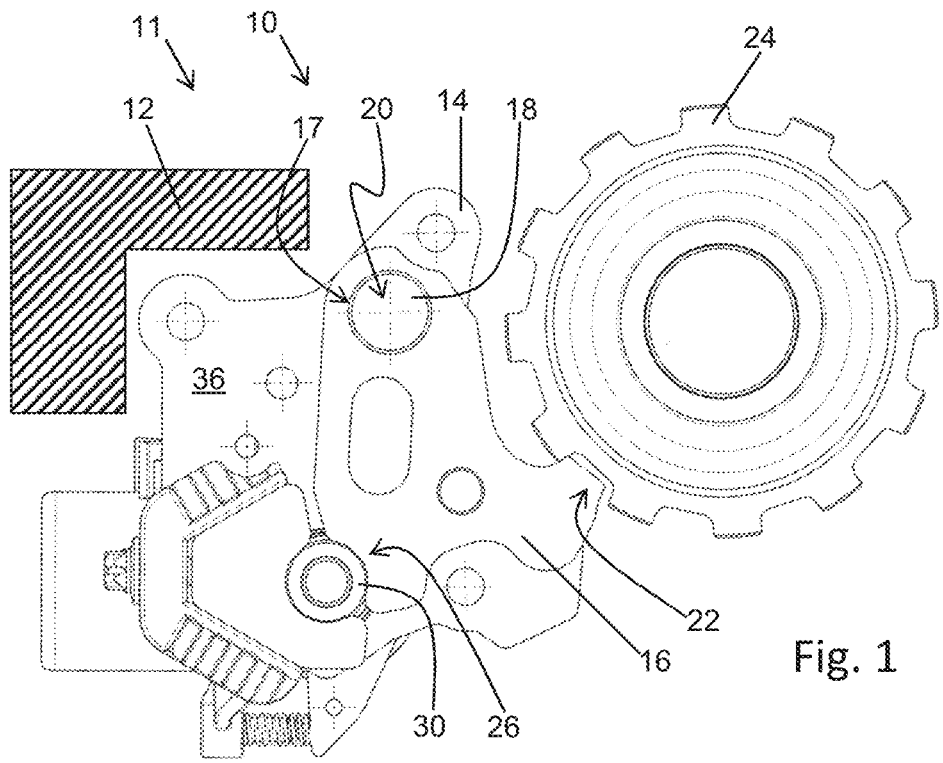

| | | | | |
|---|---|---|---|---|
| DE | 102015008709 A1 | * | 1/2016 | ......... F16H 63/3425 |
| DE | 102015014937 A1 | | 5/2017 | |
| DE | 102018130315 A1 | | 10/2019 | |
| DE | 102018003751 A1 | | 11/2019 | |
| WO | 2017211386 A1 | | 12/2017 | |
| WO | WO-2017211386 A1 | * | 12/2017 | ......... F16H 63/3425 |

OTHER PUBLICATIONS

Office Action created Sep. 11, 2020 in related/corresponding DE Application No. 10 2019 008 811.5.
Written Opinion dated Feb. 15, 2021 in related/corresponding International Application No. PCT/EP2020/085314.

* cited by examiner

PARKING LOCK SYSTEM FOR A MOTOR VEHICLE

BACKGROUND AND SUMMARY OF THE INVENTION

Exemplary embodiments of the invention relate to a parking lock system for a motor vehicle.

Parking lock systems for motor vehicles in which both a pawl and a switching rod provided for actuating the pawl are mounted on a parking lock housing configured separately from a transmission housing, are already known from DE 10 2011 086 238 A1, DE 10 2018 130 315 A1, DE 10 2018 003 751 A1 and the generic DE 10 2015 014 937 A1.

Parking lock systems in which a parking lock housing also has plate, wherein a planar region of the plate is arranged perpendicularly to the actuation direction and wherein a pawl bolt is mounted in the plate to bear the pawl, are also known from WO 2017/211386 A1, DE 10 2004 037982 and DE 10 2010 061171 A1.

Exemplary embodiments of the invention are directed to an inexpensive, compact, easily mountable, and operationally secure parking lock system.

Exemplary embodiments of the invention are based on a parking lock system for a motor vehicle, comprising a parking lock housing which can be mounted on a transmission housing, comprising a pawl mounted on the parking lock housing so as to be rotatable around an axis of rotation, a switching rod mounted on the parking lock housing so as to be slidable in an actuation direction, comprising an actuation element which is mounted on the switching rod, and comprising a hydraulic piston cylinder unit.

It is also assumed that the parking lock housing has a cylinder bore of the hydraulic piston cylinder unit, wherein the cylinder bore is arranged coaxially to the switching rod, wherein the axis of rotation of the pawl is arranged parallel to the actuation direction.

It is also assumed that the parking lock housing has a plate that is planar at least in certain regions, wherein a planar region of the plate is arranged perpendicularly to the actuation direction and wherein a pawl bolt is mounted in the plate to bear the pawl.

According to embodiments of the invention, it is proposed that, viewed in the actuation direction, the pawl be arranged behind the plate.

The plate may carry out numerous functions. Firstly, the plate can advantageously be used to affix the parking lock housing to a transmission housing, or secondly the pawl can easily be mounted on the plate.

The invention describes a compact, inexpensive, and easily mountable parking lock system in which many parts are mounted on a parking lock housing configured separately from the transmission housing.

The hydraulic piston cylinder unit advantageously acts here in the actuation direction. The piston of the piston cylinder unit is advantageously operatively connected to the switching rod.

Particularly advantageously, a cylinder of the hydraulic piston cylinder unit is configured in one part with the parking lock housing here.

A "parking lock system" is to be understood as a system provided for locking a motor vehicle transmission, in particular an automatic transmission, in an engaged state such that at least one output shaft of the motor vehicle transmission is blocked and a motor vehicle is secured against rolling away in a parked state. In a disengaged state, the parking lock system is provided to release the motor vehicle transmission. The motor vehicle transmission preferably has a parking lock gear for this purpose. In this context, a "parking lock gear" is to be understood as a gearwheel having toothing on its periphery and which is provided for coupling to the pawl. Preferably, the pawl is provided to set the parking lock gear fixed to the housing in an engaged state of the parking lock system. In this context, the "pawl" is to be understood as an element that can be pivoted between two operating positions and which has at least one pawl tooth configured to correspond to the toothing of the parking lock gear and, for engagement of the parking lock, is provided to engage positively in the toothing of the parking lock gear. Preferably, the pawl is coupled to the parking lock gear in a first operating position. In the engaged state, the pawl is in the first operating position. Preferably, the pawl is decoupled from the parking lock gear in a second operating position. In the disengaged state, the pawl is in the second operating position.

The pawl is preferably actuated by the actuating element. The "actuating element" is to be understood, in particular, as a positive locking element provided to move the pawl at least between two operating positions. Preferably, the actuating element is configured as a cone-shaped element which, by means of an axial displacement in the actuation direction, is provided to displace, in particular to pivot, the pawl by means of its cone surface in a direction which is particularly preferably orthogonal to the actuation direction.

The expression "viewed in the actuation direction" means a direction of view parallel to the axis of rotation of the pawl and the direction in which the switching rod is moved for the purposes of engaging the pawl.

A first development provides for a compression spring arranged at least partially within the parking lock housing and arranged coaxially to the switching rod such that a spring force of the compression spring is exerted onto the switching rod in the actuation direction, wherein, viewed in the actuation direction, an end of the compression spring facing away from the pawl, the plate and the pawl are arranged one after the other in said order. This arrangement enables a considerable degree of compactness of the parking lock system to be achieved.

The compression spring particularly advantageously acts directly on the piston and indirectly on the switching rod via the piston.

The cylinder of the piston cylinder unit is advantageously a part of a cylinder bore, wherein both the piston and the switching rod and the compression spring are arranged within the cylinder bore.

A development of the invention provides for at least one oil transfer point to be arranged within the planar region. In this way, a corresponding oil duct arranged in the transmission housing can advantageously be connected to the oil transfer point in which the planar region of the plate is brought into abutment with a corresponding further planar region of the transmission housing.

A further development of the invention provides for three mounting points to be provided within the plate, wherein the three mounting points span a triangle within which the planar region is at least partially arranged. With the aid of the at least three mounting points and their arrangement according to the invention, the plate can carry out several functions at the same time: it serves to hold the pawl, but also serves as an oil transfer point, wherein the three mounting points ensure the necessary surface pressure so that the oil transfer points can be sealed in a state mounted on the transmission housing.

A further development of the invention provides for a latch lever to be arranged with respect to the actuation direction in the region of the hydraulic piston cylinder unit, which latch lever is pivotably mounted on the parking lock housing, wherein a pivot plane of the latch lever is arranged perpendicularly to the axis of rotation. In this way, the latch lever is arranged on the parking lock housing in a space-saving and functionally favorable manner.

The latch lever advantageously serves to fix a piston of the piston cylinder unit in a specific position in the actuation direction. For this purpose, the piston advantageously has a recess into which the latch lever can engage for fixing.

The latch lever is advantageously configured as a substantially planar sheet metal part that is arranged parallel to the plate.

A further development of the invention provides for the pawl to have a specific geometrical shape, that is to say for the pawl to have a pawl tooth, a bearing point, and an actuation recess, wherein a first connecting line through the bearing point and the actuation recess and a second connecting line through the bearing point and the pawl tooth are at an angle of at least 30°.

In this way, overall, the switching rod and the piston cylinder unit operationally connected thereto and a parking lock gear of a motor vehicle transmission to be blocked can be arranged in a compact manner.

Further features and advantages are contained in the following description of the figures.

BRIEF DESCRIPTION OF THE DRAWING FIGURES

Figure 2:
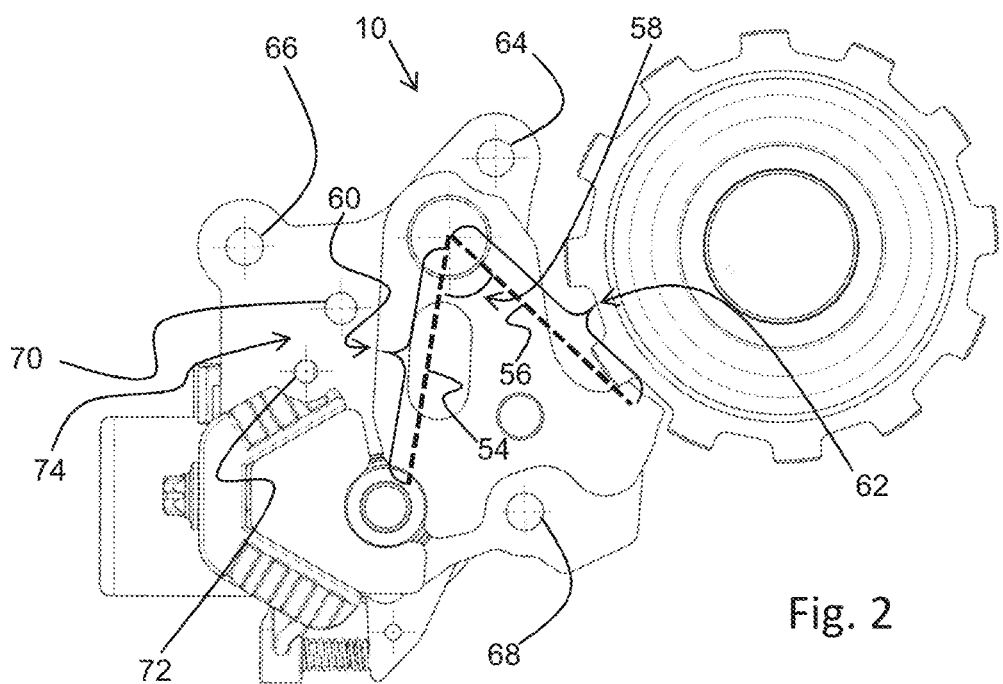

In the Figures:
FIGS. 1 and 2 show a parking lock system according to the invention in a first view,
FIG. 3 shows the parking lock system in a second view,
FIG. 4 shows the parking lock system in a third view.

DETAILED DESCRIPTION

The first view, FIGS. 1 and 2, shows a parking lock system 10 viewed in an actuation direction 32 from a side on which a pawl 16 is arranged on a plate 36 of a parking lock housing 14.

Figure 3:
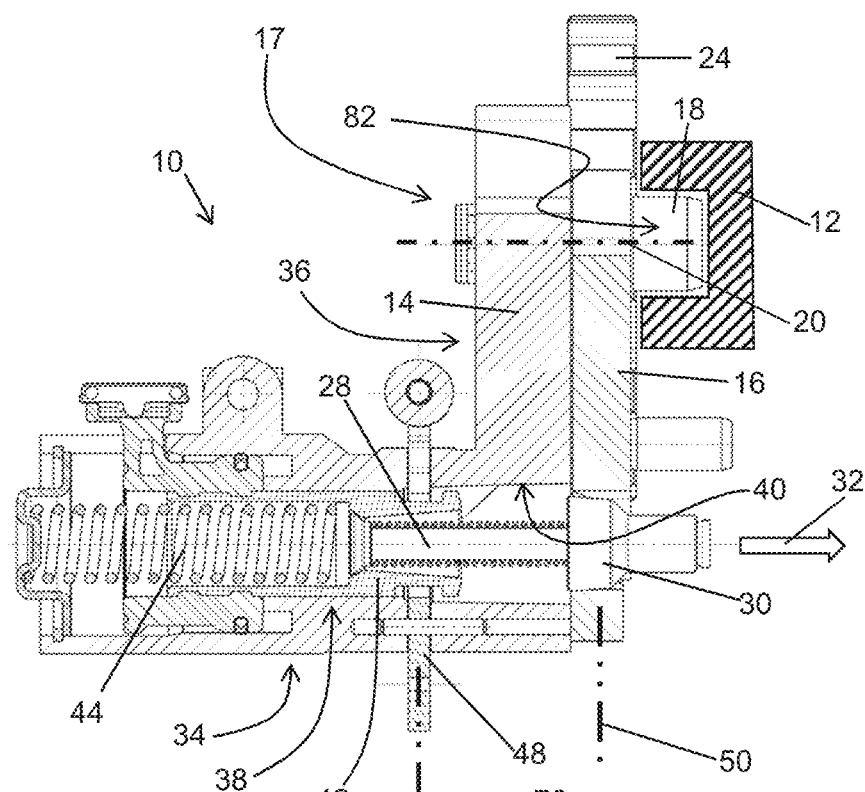
Figure 4:
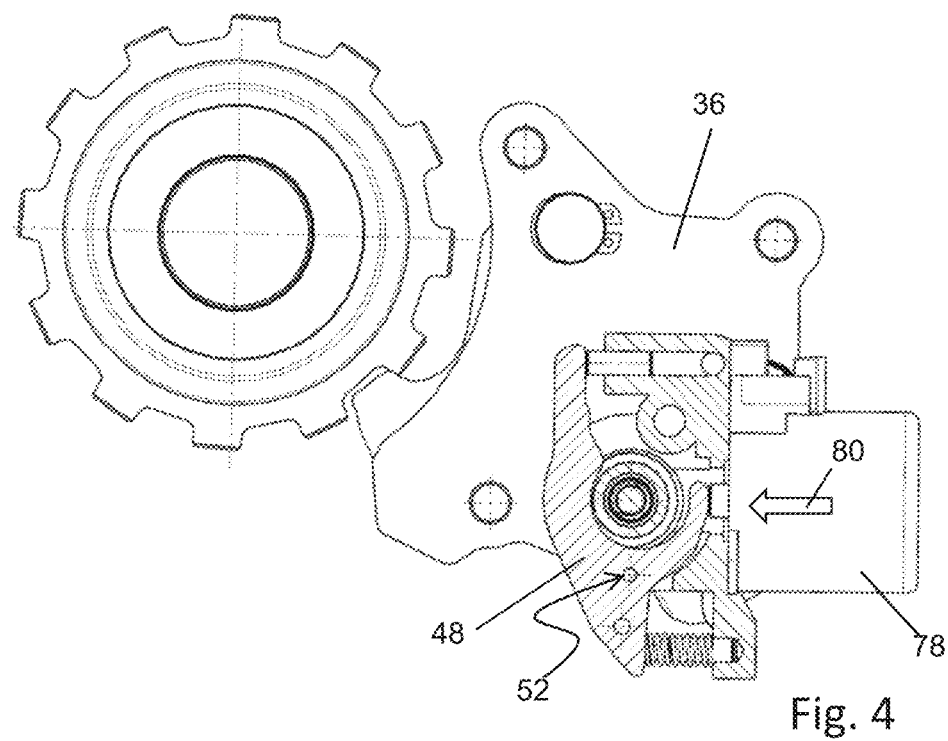

The second view, FIG. 3, shows the parking lock system 10 viewed perpendicularly to the actuation direction 32.

The third view, FIG. 4, shows the parking lock system 10 viewed in the actuation direction 32 from the rear.

The parking lock housing 14 has the plate 36 configured to be substantially planar and an actuation housing 34 firmly connected to the plate 36. The actuation housing 34 and the plate 36 are advantageously configured in one part, particularly advantageously as a one-part casting.

The actuation housing 34 has a cylinder bore 40, within which is arranged a piston 42. The cylinder bore 40 and the piston 42 are in each case part of a hydraulic piston cylinder unit 38. A switching rod 28 arranged within the cylinder bore 40 can likewise be displaced in the actuation direction 32 by means of the piston cylinder unit 38. An actuation element 30 is arranged at the end of the switching rod 28. The actuation element 30 is advantageously cone-shaped and is preferably arranged coaxially to the switching rod 28. The actuation element 30 interacts with an actuation recess 26 in the pawl 16 such that a movement of the actuation element 30 in the actuation direction 32 causes a pivoting movement of the pawl 16 in a first pivot plane 50.

Furthermore, a first compression spring 44 is arranged coaxially to the piston 42, mostly within the cylinder bore 40. The piston 42 and, with it, also the switching rod 28 can be moved in the actuation direction 32 by means of the first compression spring 44.

Viewed in the direction of an axis of rotation 20 of the pawl 16, in a non-actuated state of the pawl 16, the actuation element 30 is arranged axially at least partially overlapping the plate 36 or axially at least partially at the same level as the plate 36.

The compression spring 44 has an end facing away from the pawl 16 and an end facing towards the pawl 16. Viewed in the actuation direction 32, the end of the compression spring 44 facing away from the pawl 16, the plate 36 and the pawl 16 are arranged one after the other in said order.

The pawl 16 and the plate 36 are advantageously configured to be substantially planar, as a result of which they are easier to manufacture and they are advantageously arranged parallel to one another.

A latch lever 48 is arranged so as to be pivotable about a pivot axis 52 within a second pivot plane 76 on the actuation housing 34. The piston 42 can be fixed in a position corresponding to a hydraulically disengaged pawl 16 by means of the latch lever 48. The latch lever is actuated with the aid of an electromechanical actuator 78.

Viewed in the actuation direction 32, the latch lever 48, the plate 36, and the pawl 16 are arranged one after the other in said order.

The electromechanical actuator 78 is advantageously affixed to the actuation housing 34. A further actuation direction 80 of the electromechanical actuator 78 is arranged perpendicularly to the actuation direction 32.

Viewed in the actuation direction, the first compression spring 44, the latch lever 48, and the plate 36 are advantageously arranged in said order on the actuation housing 34.

The pawl 16 is mounted on the plate 36 so as to be rotatable about the axis of rotation 20 by means of a pawl bolt 18. For this purpose, the pawl 16 has a bearing point 17. The axis of rotation 20 is arranged parallel to the actuation direction 32. The pawl bolt 18 is advantageously arranged in a bore in the plate 36 of the parking lock housing 14.

The pawl bolt 18 particularly advantageously protrudes beyond the pawl 16 on a side of the pawl 16 facing away from the plate 36, wherein the pawl bolt 18 is mounted on the side of the pawl 16 facing away from the plate 36 in an intake 82 of the transmission housing 12. The intake 82 is, for example, configured as a blind hole or as a bore in the transmission housing 12. FIG. 3 shows a schematic view of the transmission housing 12 and the intakes 82.

The bearing of the pawl 16 or of the pawl bolt 18 on both sides as described results in a particularly stable and long-lasting bearing of the pawl 16.

Viewed in the direction of the axis of rotation 20, the plate 36, the pawl 16, and the intake 82 are arranged one after the other in that order.

There is advantageously only a small gap in the region around the pawl bolt 18 between the pawl 16 and the plate 36. There is similarly also only a small gap around the pawl bolt 18 between the pawl 16 and the transmission housing 12. A small gap is advantageously understood to be a gap of less than 5 mm, particularly advantageously a gap of less than 3 mm.

The parking lock housing 14 is mounted on an only schematically shown transmission housing 12 of a transmission 11 of a motor vehicle by means of a first mounting point 64, a second mounting point 66, and a third mounting point 68. Only a parking lock gear 24 of the transmission is otherwise shown, this being connected in a known rotationally fixed manner to a shaft of the transmission 11 not shown in any further detail.

A particular geometric shape of the pawl 16 also contributes to the advantageous overall concept of the parking lock system 10. A pawl tooth 22 of the pawl 16, the bearing point 17 which is arranged coaxially about the axis of rotation 20, and the actuation recess 26 are advantageously arranged such that a first connecting line 54 through the bearing point 17 and the actuation recess 26 and a second connecting line 56 through the bearing point 17 and the pawl tooth 22 are at an angle 58 of at least 30°. The pawl 16 therefore has a shape which is triangular in a certain manner and which is actually a disadvantage per se owing to a greater weight compared to known "slimmer" pawls, but is advantageous in the overall system of the parking lock system 10.

A first spacing 60 between the bearing point 17 and the actuation recess 26 is advantageously 80% to 120% of a second spacing 62 between the bearing point 17 and the pawl tooth 22.

The bearing point 17, actuation recess 26, and pawl tooth 22 are therefore arranged virtually in an isosceles triangle. The bearing point 17, actuation recess 26, and pawl tooth 22 are particularly advantageously arranged in a substantially equilateral triangle.

In order to affix the parking lock system 10 to the transmission housing 12, the parking lock housing 14 has a first mounting point 64, a second mounting point 66, and a third mounting point 68. In the exemplary embodiment, the mounting points 64, 66, and 68 are configured as bores, so fixing is provided by means of screws (not shown) in corresponding further bores (not shown) in the transmission housing 12.

The mounting points 64, 66, and 68 are arranged spaced apart from one another in the plate 36. The plate 36 also has a planar region 74 in which a first oil transfer point 70 and a second oil transfer point 72 are arranged. The two oil transfer points 70, 72 are openings of oil ducts which run in the parking lock housing 14 and serve to supply oil to the hydraulic piston cylinder unit.

The mounting points 64, 66, 68 are advantageously arranged in the shape of a further triangle, wherein the oil transfer points 70, 72 are arranged within the further triangle or at least near the triangle. A necessary surface pressure for sealing the oil transfer points 70, 72 can be provided through the at least three mounting points 64, 66, 68.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

10 Parking lock system
11 Transmission
12 Transmission housing
14 Parking lock housing
16 Pawl
17 Bearing point
18 Pawl bolt
20 Axis of rotation
22 Pawl tooth
24 Parking lock gear
26 Actuation recess
28 Switching rod
30 Actuation element
32 Actuation direction
34 Actuation housing
36 Plate
38 Piston cylinder unit
40 Cylinder bore
42 Piston
44 First compression spring
48 Latch lever
50 First pivot plane
52 Pivot axis
54 First connecting line
56 Second connecting line
58 Angle
60 First spacing
62 Second spacing
64 First mounting point
66 Second mounting point
68 Third mounting point
70 First oil transfer point
72 Second oil transfer point
74 Planar region
76 Second pivot plane
78 Electromechanical actuator
80 Further actuation direction
82 Intake

The invention claimed is:
1. A parking lock system for a motor vehicle, the parking lock system comprising:
a parking lock housing configured for mounting on a transmission housing;
a pawl mounted on the parking lock housing so as to be rotatable about an axis of rotation;
a switching rod mounted on the parking lock housing so as to be slidable in an actuation direction;
an actuation element mounted on the switching rod, wherein the axis of rotation is arranged parallel to the actuation direction,
wherein the parking lock housing has a plate, wherein a planar region of the plate is arranged perpendicularly to the actuation direction and wherein a pawl bolt is mounted in the plate to bear the pawl,
wherein, viewed in the actuation direction, the pawl is arranged behind the plate,
wherein the parking lock housing has an actuation housing configured as one part and as a casting with the plate,
wherein the actuation housing has a cylinder bore of a hydraulic piston cylinder unit, wherein the cylinder bore is arranged coaxially to the switching rod,
wherein the hydraulic piston cylinder unit is configured to displace the switching rod in the actuation direction,
wherein a piston of the piston cylinder unit is arranged within the cylinder bore,
wherein a latch lever is arranged with respect to the actuation direction in a region of the hydraulic piston cylinder unit, wherein the latch lever is pivotably mounted on the actuation housing, wherein a pivot plane of the latch lever is arranged perpendicularly to the axis of rotation, and wherein the pawl has a pawl tooth, a bearing point, and an actuation recess, wherein a first connecting line through the bearing point and the actuation recess and a second connecting line through the bearing point and the pawl tooth are at an angle of at least 30°.

2. The parking lock system of claim 1, wherein a compression spring is arranged at least partially within the parking lock housing and is arranged coaxially to the switching rod such that a spring force of the compression spring is exerted onto the switching rod in the actuation direction, wherein, viewed in the actuation direction, an end of the compression spring is facing away from the pawl, and wherein the plate and the pawl are arranged one after the other in this order.

3. The parking lock system of claim 1, wherein, viewed in a direction of the axis of rotation of the pawl, in a non-actuated state of the pawl, the actuation element is arranged axially at least partially overlapping the plate.

4. The parking lock system of claim 1, wherein the plate includes three mounting points spanning a triangle within which the planar region of the plate is at least partially arranged.

5. The parking lock system of claim 1, wherein, viewed in the actuation direction, the latch lever, the plate, and the pawl are arranged one after the other in this order.

6. The parking lock system of claim 1, wherein a first spacing between the bearing point and the actuation recess is 80% to 120% of a second spacing between the bearing point and the pawl tooth.

7. The parking lock system of claim 1, wherein the latching lever is a planar sheet metal part arranged parallel to the plate.

8. The parking lock system of claim 1, wherein the pawl includes a recess configured such that movement of the actuation element in the actuation direction causes a pivoting movement of the pawl in a first pivot plane.

9. The parking lock system of claim 1, wherein the piston has a recess that is engageable by the latch lever.

10. A transmission, comprising:
a transmission housing;
a parking lock gear; and
a parking lock system, which comprises
 a parking lock housing configured for mounting on a transmission housing;
 a pawl mounted on the parking lock housing so as to be rotatable about an axis of rotation;
 a switching rod mounted on the parking lock housing so as to be slidable in an actuation direction;
 an actuation element mounted on the switching rod, wherein the axis of rotation is arranged parallel to the actuation direction,
 wherein the parking lock housing has a plate, wherein a planar region of the plate is arranged perpendicularly to the actuation direction and wherein a pawl bolt is mounted in the plate to bear the pawl,
 wherein, viewed in the actuation direction, the pawl is arranged behind the plate,
 wherein the parking lock housing has an actuation housing configured as one part and as a casting with the plate,
 wherein the actuation housing has a cylinder bore of a hydraulic piston cylinder unit, wherein the cylinder bore is arranged coaxially to the switching rod,
 wherein the hydraulic piston cylinder unit is configured to displace the switching rod in the actuation direction,
 wherein a piston of the piston cylinder unit is arranged within the cylinder bore,
 wherein a latch lever is arranged with respect to the actuation direction in a region of the hydraulic piston cylinder unit, wherein the latch lever is pivotably mounted on the actuation housing,
 wherein a pivot plane of the latch lever is arranged perpendicularly to the axis of rotation,
wherein the transmission housing has an intake in which the pawl bolt is borne,
wherein, viewed in the actuation direction, the plate, the pawl, and the intake are arranged one after the other in this order, and
wherein the pawl has a pawl tooth, a bearing point, and an actuation recess, wherein a first connecting line through the bearing point and the actuation recess and a second connecting line through the bearing point and the pawl tooth are at an angle of at least 30°.

11. A transmission, comprising:
a transmission housing;
a parking lock gear; and
a parking lock system, which comprises
 a parking lock housing configured for mounting on a transmission housing;
 a pawl mounted on the parking lock housing so as to be rotatable about an axis of rotation;
 a switching rod mounted on the parking lock housing so as to be slidable in an actuation direction;
 an actuation element mounted on the switching rod, wherein the axis of rotation is arranged parallel to the actuation direction,
 wherein the parking lock housing has a plate, wherein a planar region of the plate is arranged perpendicularly to the actuation direction and wherein a pawl bolt is mounted in the plate to bear the pawl,
 wherein, viewed in the actuation direction, the pawl is arranged behind the plate,
 wherein the parking lock housing has an actuation housing configured as one part and as a casting with the plate,
 wherein the actuation housing has a cylinder bore of a hydraulic piston cylinder unit, wherein the cylinder bore is arranged coaxially to the switching rod,
 wherein the hydraulic piston cylinder unit is configured to displace the switching rod in the actuation direction,
 wherein a piston of the piston cylinder unit is arranged within the cylinder bore,
 wherein a latch lever is arranged with respect to the actuation direction in a region of the hydraulic piston cylinder unit, wherein the latch lever is pivotably mounted on the actuation housing,
 wherein a pivot plane of the latch lever is arranged perpendicularly to the axis of rotation,
wherein the transmission housing has an intake in which the pawl bolt is borne,
wherein, viewed in the actuation direction, the plate, the pawl, and the intake are arranged one after the other in this order, and
wherein at least one oil transfer point is arranged within the planar region, wherein the transmission housing has an oil duct, and wherein the planar region is arranged on the transmission housing such that the oil duct is connected to the oil transfer point.

12. The transmission of claim 10, wherein the latching lever is a planar sheet metal part arranged parallel to the plate.

13. The transmission of claim 10, wherein the pawl includes a recess configured such that movement of the actuation element in the actuation direction causes a pivoting movement of the pawl in a first pivot plane.

14. The transmission of claim 10, wherein the piston has a recess that is engageable by the latch lever.

* * * * *